United States Patent
Igarashi et al.

(10) Patent No.: US 6,907,867 B2
(45) Date of Patent: Jun. 21, 2005

(54) CONTROL APPARATUS AND CONTROL METHOD FOR INTERNAL COMBUSTION ENGINE

(75) Inventors: Osamu Igarashi, Susono (JP); Koichi Akita, Susono (JP); Shoji Sasaki, Mishima (JP); Hiromasa Hashimoto, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/792,814

(22) Filed: Mar. 5, 2004

(65) Prior Publication Data

US 2004/0182371 A1 Sep. 23, 2004

(30) Foreign Application Priority Data

Mar. 17, 2003 (JP) ........................................ 2003-072439

(51) Int. Cl.⁷ .......................... F02B 37/00; F02B 37/04; F02B 37/10; F02B 39/10; F02D 23/00
(52) U.S. Cl. .......................... 123/565; 60/607; 60/608; 60/611; 60/612; 123/564
(58) Field of Search ................................. 123/564, 565; 60/607, 608, 612, 611

(56) References Cited

U.S. PATENT DOCUMENTS

| | | | |
|---|---|---|---|
| 4,505,117 A | * 3/1985 | Matsuoka | ..................... 60/609 |
| 4,730,457 A | * 3/1988 | Yamada et al. | ................ 60/609 |
| 4,738,110 A | 4/1988 | Tateno | ........................... 60/609 |
| 5,154,155 A | * 10/1992 | Ohnaka et al. | .............. 123/564 |
| 5,307,783 A | * 5/1994 | Satoya et al. | ................ 123/564 |
| 5,335,500 A | 8/1994 | Wunderlich et al. | ........... 60/609 |
| 5,771,868 A | 6/1998 | Khair et al. | ................... 60/609 |
| 6,029,452 A | * 2/2000 | Halimi et al. | .................. 60/608 |
| 6,062,026 A | * 5/2000 | Woollenweber et al. | ....... 60/612 |
| 6,622,710 B2 | * 9/2003 | Hasegawa et al. | ........... 123/563 |

FOREIGN PATENT DOCUMENTS

| | | |
|---|---|---|
| DE | 199 05 112 A1 | 8/2000 |
| GB | 2 186 023 | 8/1987 |
| JP | A 2001-518590 | 10/2001 |
| WO | WO 99/17008 | 4/1999 |

* cited by examiner

Primary Examiner—Sheldon J Richter
(74) Attorney, Agent, or Firm—Oliff & Berridge PLC

(57) ABSTRACT

A control apparatus for an internal combustion engine has a supercharger connected to an intake passage of the internal combustion engine and driven by a motor, a bypass passage which is provided for the intake passage in such a manner as to bypass the supercharger, flow amount adjustment device which arbitrarily adjusts a flow amount of air flowing through the bypass passage, and controller which controls the motor and the flow amount adjustment device. The flow amount adjustment device is electrically driven. The controller stops the supercharger from performing supercharging after driving the flow amount adjustment device and starting suction of air via the bypass passage.

13 Claims, 3 Drawing Sheets

CONTROL APPARATUS AND CONTROL METHOD FOR INTERNAL COMBUSTION ENGINE

INCORPORATION BY REFERENCE

The disclosure of Japanese Patent Application No. 2003-72439 filed on Mar. 17, 2003 including the specification, drawings and abstract is incorporated herein by reference in its entirety.

BACKGROUND OF THE INVENTION

1. Field of Invention

The invention relates to a control apparatus/method for an internal combustion engine having a supercharger connected to an intake passage and driven by a motor.

2. Description of Related Art

An attempt to provide an intake passage of an engine (internal combustion engine) with a motor-driven supercharger and to achieve a high output (or low fuel consumption) through supercharging performed by the supercharger has generally been made. Such an internal combustion engine is disclosed also in Published Japanese translation of a PCT application JP-T-2001-518590. In the internal combustion engine disclosed in Published Japanese translation of a PCT application JP-T-2001-518590, an intake passage is bifurcated into two branch flow passages, which are combined into one flow passage again. A supercharger driven by a motor is connected to one of the branch flow passages. A combined portion of the branch flow passages is provided with a switching valve that changes the branch flow passage from which intake air flows toward the downstream side. When the supercharger is operated, the switching valve opens the branch flow passage that is provided with the supercharger, and closes the branch flow passage that is not provided with the supercharger. On the contrary, when the supercharger is not operated, the switching valve closes the branch flow passage that is provided with the supercharger, and opens the branch flow passage that is not provided with the supercharger. In this manner, while the supercharger is prevented from causing a loss in intake air, the backflow of intake air is prevented.

The state of switching valve in the internal combustion engine disclosed in Published Japanese translation of a PCT application JP-T-2001-518590 mentioned above is changed in accordance with a difference between a pressure in each of branch pipes on the upstream side and a pressure in an intake pipe on the downstream side. If the switching valve is designed to make use of a differential pressure as described above, the state of the switching valve may be inappropriately changed and the flow of the intake air may pause for a moment. For example, if the supercharger is stopped from performing supercharging, the state of the switching valve is changed after stoppage of the supercharger, and the flow of air is created in the branch pipe that is not provided with the supercharger. At this moment, the flow of intake air pauses, and the internal combustion engine may be operated discontinuously.

SUMMARY OF THE INVENTION

It is an object of the invention to provide a control apparatus/method for controlling an internal combustion engine having a motor-driven supercharger capable of optimally performing supercharging in accordance with an operational state.

A first aspect of the invention relates to a control apparatus for an internal combustion engine having a supercharger connected to an intake passage of the internal combustion engine and driven by a motor; a bypass passage which is provided for the intake passage in such a manner as to bypass the supercharger; a flow amount adjustment device which arbitrarily adjusts a flow amount of air flowing through the bypass passage by being driven electrically; and a controller which stops the supercharger from performing supercharging after driving the flow amount adjustment device and starting suction of air via the bypass passage.

A second aspect of the invention relates to a control method for an internal combustion engine having a supercharger connected to an intake passage of the internal combustion engine and driven by a motor, a bypass passage which is provided for the intake passage in such a manner as to bypass the supercharger, and flow amount adjustment device which can arbitrarily adjust a flow amount of air flowing through the bypass passage. The method includes a first step of determining whether the supercharger is to be stopped; and a second step of driving electrically the flow amount adjustment device, starting suction of air via the bypass passage, and then stopping the supercharger from performing supercharging if it is determined in the first step that the supercharger is to be stopped.

BRIEF DESCRIPTION OF THE DRAWINGS

The foregoing and further objects, features and advantages of the invention will become apparent from the following description of a preferred embodiment with reference to the accompanying drawings, wherein like numerals are used to represent like elements and wherein.

DETAILED DESCRIPTION OF THE PREFERRED EMBODIMENT

Figure 1:
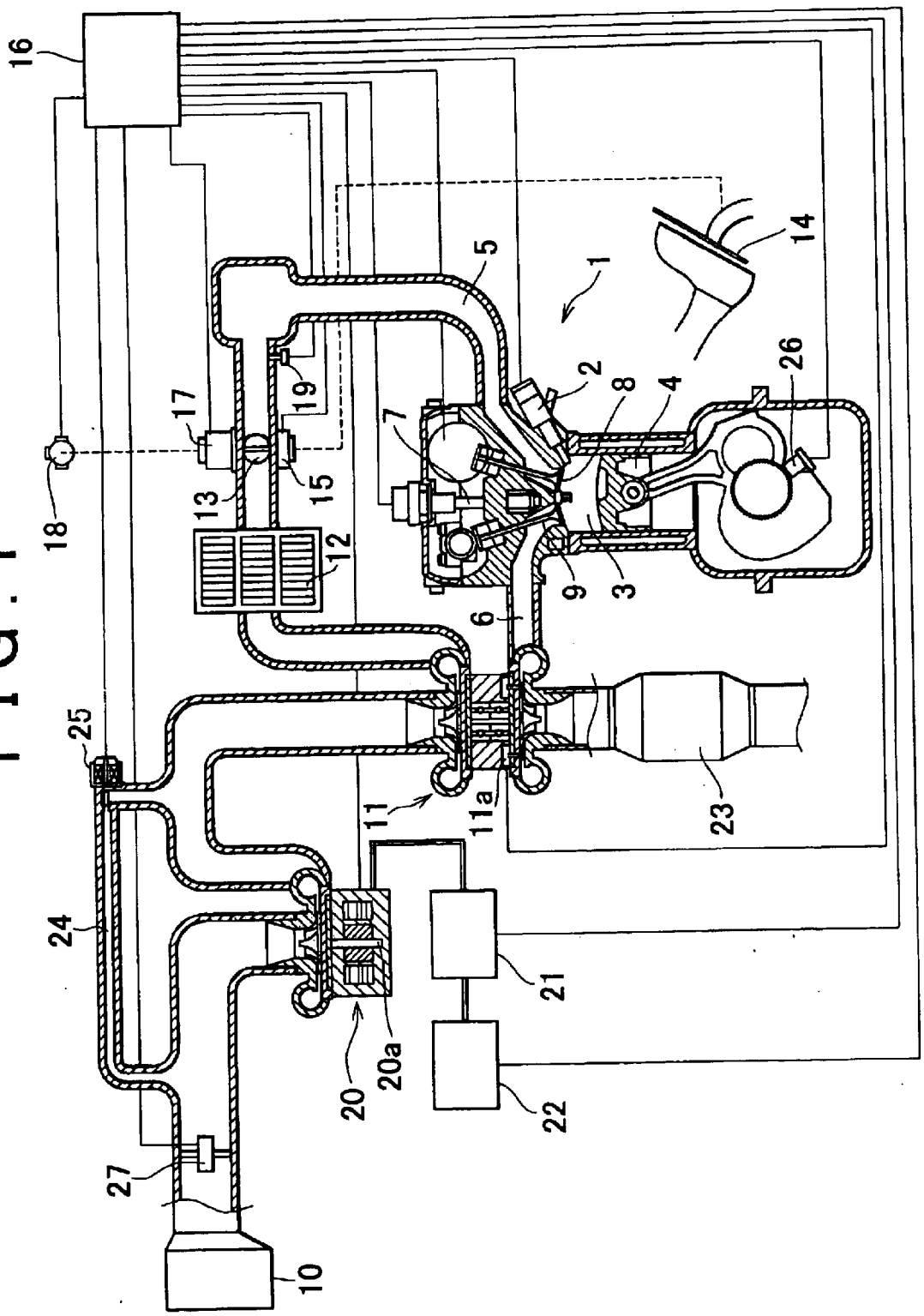
FIG. 1 is a schematic diagram showing the construction of an internal combustion engine (engine) having a control apparatus in accordance with one embodiment of the invention.

A control apparatus in accordance with one embodiment of the invention will be described hereinafter. FIG. 1 shows an engine 1 having the control apparatus in accordance with the embodiment.

In some cases, the term "supercharging pressure" is used to indicate a difference from an atmospheric pressure. In other cases, the term "supercharging pressure" is used to indicate an absolute pressure in an intake pipe. The following description will be made while clarifying which one of the terms is referred to, wherever they need to be distinguished from each other. For instance, in the case where supercharging pressure control is performed on the basis of an output from a pressure sensor for detecting a pressure in an intake pipe, if the pressure sensor is designed to detect a difference from an atmospheric pressure, it is easy to perform supercharging pressure control on the basis of "a supercharging pressure as a difference from an atmospheric pressure". On the other hand, if the pressure sensor is designed to detect an absolute pressure, it is easy to perform supercharging pressure control on the basis of "an intake pressure as an absolute pressure".

Although the engine 1 described in the present embodiment is a multi-cylinder engine, only one cylinder is illustrated in FIG. 1 as a cross-sectional view. The engine 1 is designed to inject fuel into a cylinder 3 by means of an injector 2. The engine 1 is a so-called lean-burn engine in which stratified combustion is possible as well. The engine 1 can achieve a reduction in fuel consumption as well as an enhancement of output by supercharging a larger amount of intake air by means of a turbocharger (turbo unit) 11 and a supercharger 20 driven by an after-mentioned motor 20a.

The engine 1 can compress air sucked into the cylinder 3 via an intake passage 5 by means of a piston 4, inject fuel into a dent formed in an upper face of the piston 4, gather a high-concentration mixture around an ignition plug 7, and burn the mixture by igniting it with the ignition plug 7 (stratified combustion). If fuel is injected during a suction stroke, normal homogeneous combustion can be carried out as well. A space between the interior of the cylinder 3 and the intake passage 5 is opened and closed by an intake valve 8. Exhaust gas produced after combustion is discharged to an exhaust passage 6. A space between the interior of the cylinder 3 and the exhaust passage 6 is opened and closed by an exhaust valve 9. An air cleaner 10, an air flow meter 27, a supercharger 20, a turbo unit 11, an intercooler 12, a throttle valve 13 and the like are disposed along the intake passage 5 and in this order from an upstream side thereof.

The air cleaner 10 removes dirt, dust and the like from intake air. The air flow meter 27 of the present embodiment is of hot-wire type and detects an intake air amount as a mass flow amount. The supercharger 20 is electrically driven by the motor 20a that is built therein. A compressor turbine is directly connected to an output shaft of the motor 20a. The motor 20a of the supercharger 20 is connected to a battery 22 via a controller 21. The controller 21 controls the driving of the motor 20a by controlling the power supplied thereto. The controller 21 can detect a rotational speed of the motor 20a (i.e., a rotational speed of the compressor turbine).

A bypass passage is so provided as to connect upstream and downstream sides of the supercharger 20. Namely, in this section, the intake passage 5 is bifurcated into two flow passages extending in parallel. A valve 25 for adjusting an amount of intake air flowing through the bypass passage 24 is connected to the bypass passage 24. The valve 25 of the present embodiment adjusts an amount of intake air through duty control. As a matter of course, the valve 25 can also be maintained in a fully open state or a fully closed state. That is, the amount of the intake air flowing through the bypass passage 24 per unit time can be adjusted by the valve 25. The valve 25 functions as flow amount adjustment means. The valve 25 is electrically driven and can arbitrarily adjust an amount of air flowing through the bypass passage 24.

When the supercharger 20 is out of operation, it acts as a resistance against intake air. In such a case, intake air is caused to flow through the bypass passage, so that the supercharger 20 is prevented from serving as a resistance against intake air. On the contrary, if the bypass passage is left open when starting the supercharger 20, intake air supercharged by the supercharger 20 flows backwards via the bypass passage 24. For this reason, the bypass passage 24 is shut off. If the supercharger 20 has finished supercharging, the bypass passage 24 that is closed (or that allows only a limited amount of intake air to flow therethrough) is opened.

However, if the bypass passage 24 is simply shut off or opened in accordance with the driving or stoppage of the supercharger 20, the flow of intake air tends to pause. This is not desirable from the standpoint of the output performance or exhaust emission properties of the engine 1. In the present embodiment, therefore, the driving of the valve 25 is so controlled as to prevent the flow of intake air from pausing, so that optimal supercharging is carried out. This control will be described later in detail.

The turbo unit 11 is disposed between the intake passage 5 and the exhaust passage 6 and performs supercharging. That is, the engine 1 of the present embodiment can perform supercharging by means of the supercharger 20 and the turbo unit 11 that are disposed in series. In the turbo unit 11, a turbine-side impeller and a compressor-side impeller are coupled by a rotational shaft. The turbo unit 11 has a variable nozzle mechanism 11a as a variable geometry mechanism. The variable nozzle mechanism 11a is controlled by an ECU 16, which will be described later.

An air-cooled intercooler 12 disposed downstream of the turbo unit 11 is connected to the intake passage 5. The intercooler 12 lowers a temperature of intake air that has risen in temperature owing to an increase in pressure resulting from the supercharging performed by the supercharger 20 or the turbo unit 11. The intercooler 12 lowers a temperature of intake air and thus enhances filling efficiency.

A throttle valve 13 for adjusting an amount of intake air is disposed downstream of the intercooler 12. The throttle valve 13 of the present embodiment is a so-called electronically controlled throttle valve. An accelerator positioning sensor 15 detects an operation amount of an accelerator pedal 14. On the basis of a result detected by the accelerator positioning sensor 15 and information obtained from other sensors, the ECU 16 determines an opening of the throttle valve 13. The throttle valve 13 is opened and closed by a throttle motor 17 that is disposed in association therewith. A throttle positioning sensor 18 for detecting an opening of the throttle valve 13 is also disposed in association therewith.

A pressure sensor 19 for detecting a pressure (supercharging pressure or intake pressure) in the intake passage 5 is also disposed downstream of the throttle valve 13. The sensors 15, 18, 19 and 27 are connected to the ECU 16. Results detected by the sensors are delivered to the ECU 16. The ECU 16 is an electronic control unit that is composed of a CPU, a ROM, a RAM and the like. The aforementioned components such as the injector 2, the ignition plug 7, the controller 21, the battery 22 and the like are connected to the ECU 16. These components are controlled by signals output from the ECU 16, or states of the components (e.g., a charging state of the battery 22) are monitored by the ECU 16.

The valve 25 provided in the bypass passage 24 is also connected to the ECU 16. The valve 25 is electrically driven by a signal output from the ECU 16. The ECU 16 detects an operational state of the engine 1 from results detected by the sensors or the like, and drives the valve 25 on the basis of the detected results. That is, the ECU 16 functions as control means for controlling the driving of the valve 25 and controlling the motor 20a via the controller 21.

On the other hand, the exhaust passage 6 is provided with an exhaust gas purification catalyst 23 for purifying exhaust gas. The exhaust gas purification catalyst 23 is disposed downstream of the turbo unit 11. A crank positioning sensor 26 for detecting a rotational position of a crank shaft of the engine 1 is installed in the vicinity thereof. The crank positioning sensor 26 can also detect an engine speed from a position of the crank shaft.

Figure 2:
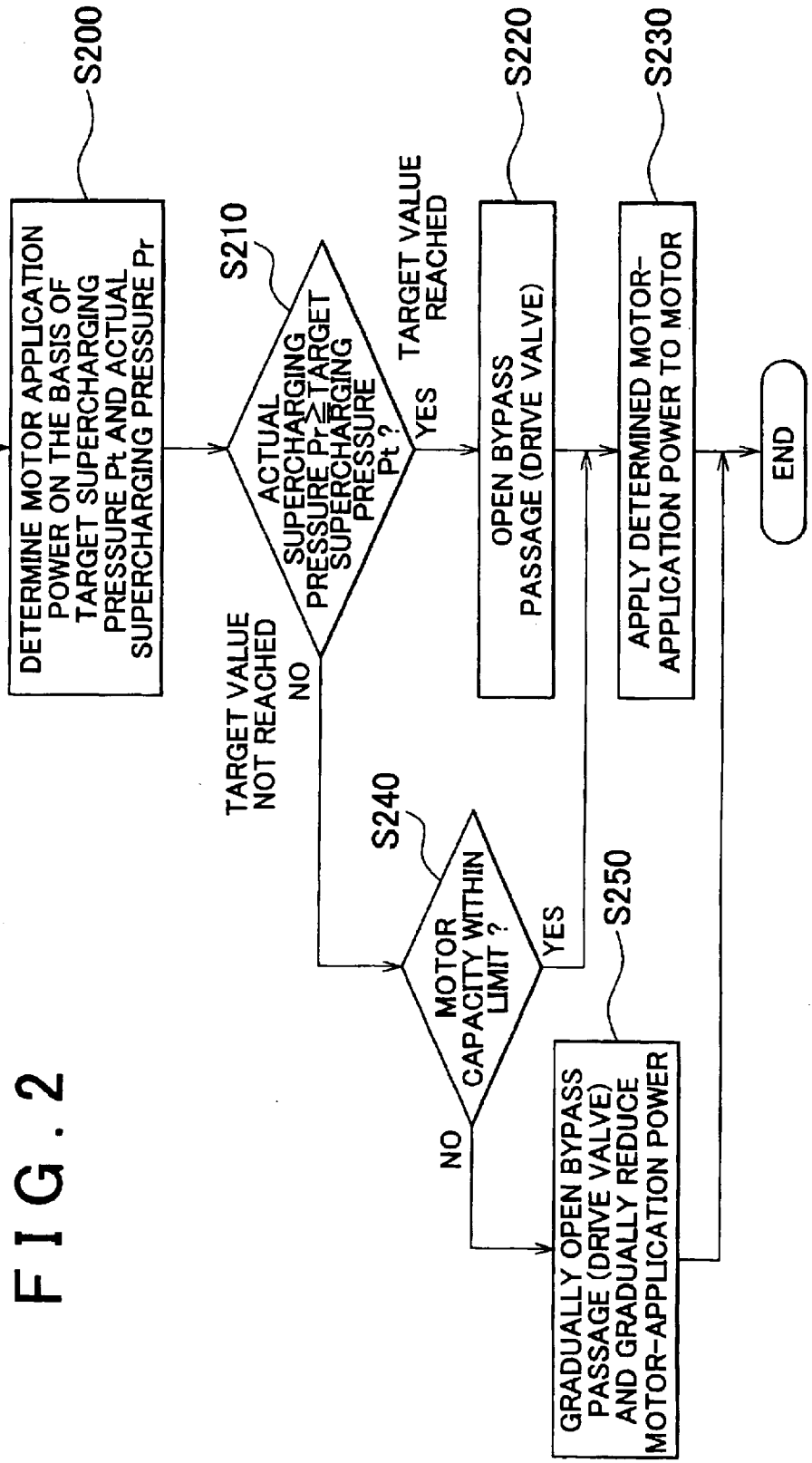
FIG. 2 is a flowchart of valve control that is performed by the control apparatus in accordance with the embodiment of the invention.

The above-mentioned control of the supercharger 20 and the valve 25 will now be described. FIG. 2 shows a flowchart of this control. Referring to the flowchart shown in FIG. 2, it will be described how the valve 25 adjusts a flow amount. The control that will be described below is performed especially when stopping supercharging that is performed by the supercharger 20. Namely, the valve 25 keeps the bypass passage 24 shut off before a routine of the flowchart shown in FIG. 2 is started.

First of all, a power to be applied to the motor 20a is determined in another routine (step 200). The power to be applied to the motor 20a is determined on the basis of a target supercharging pressure Pt and an actual supercharging pressure Pr. Supercharging control performed in that routine will be described briefly.

First of all, an engine speed is detected by the crank positioning sensor 26, and an engine load is estimated from an intake air amount (estimated from the pressure sensor 19) or a throttle opening (detected by the throttle positioning sensor 18). Next, a base target supercharging pressure Pb is calculated from the engine speed and the engine load. The base target supercharging pressure Pb is a supercharging pressure that is predicted when the engine rotates at a predetermined speed and at a predetermined load during constant operation. The base target supercharging pressure Pb is acquired in advance through an experiment or the like, and is stored in a ROM inside the ECU 16 as a map. The above-mentioned control of the variable nozzle is performed on the basis of the base target supercharging pressure Pb.

Figure 3:
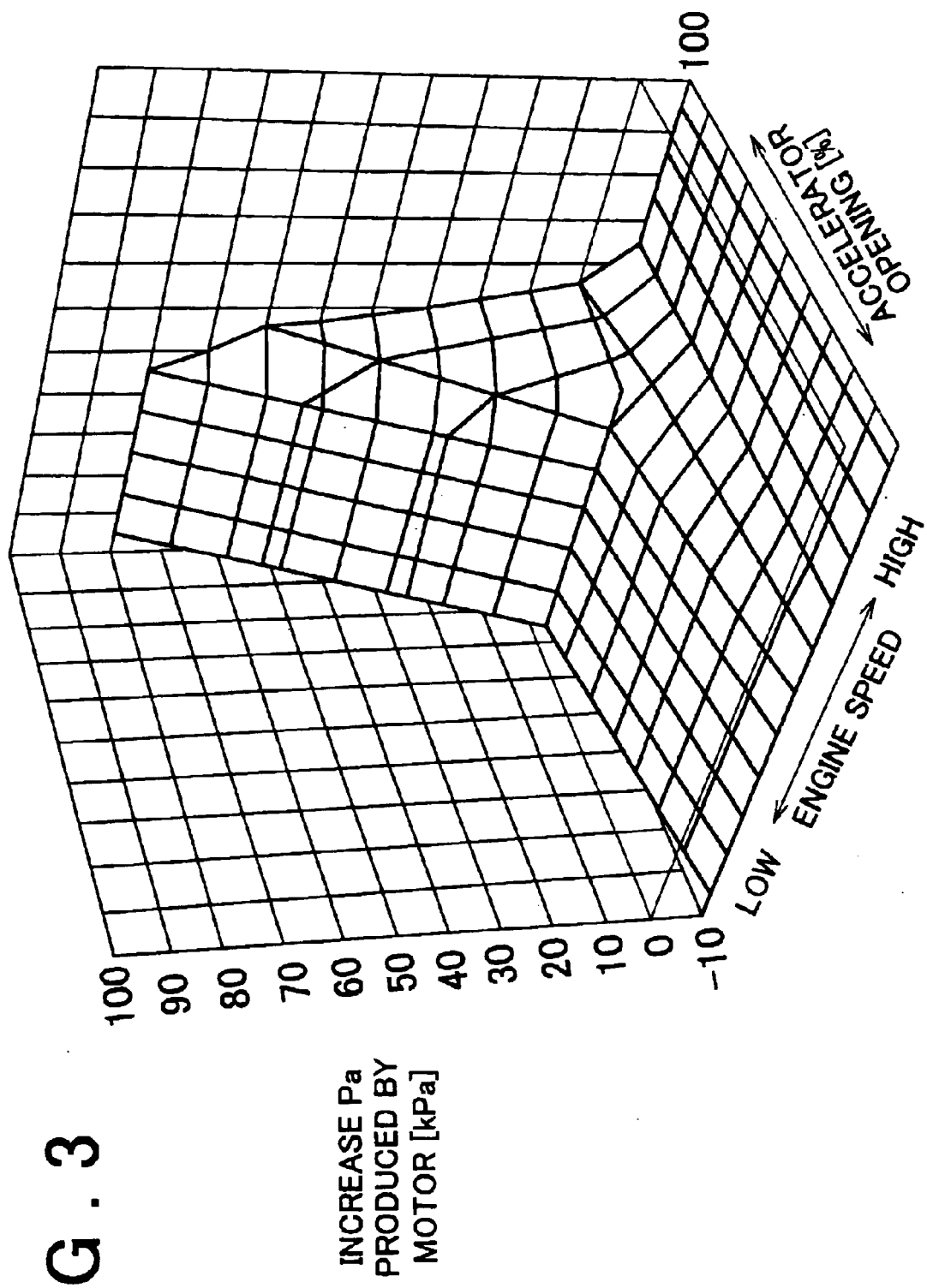
FIG. 3 is a map for calculating an increase in supercharging pressure which is used in determining a target supercharging pressure.

Next, a supercharging pressure increase Pa to be produced by the supercharger 20 is determined on the basis of an engine speed detected by the rotational speed sensor 26 and an accelerator opening detected by the accelerator positioning sensor 15. A relationship among engine speed, accelerator opening, and the supercharging pressure increase Pa is determined in advance through an experiment or the like, and is stored in the ROM inside the ECU 16 as a map. This map is illustrated in FIG. 3. As shown in FIG. 3, the aforementioned supercharging pressure increase Pa is set as a positive value so that the supercharger 20 provides assistance, only when the engine 1 is operated within a range where the engine speed is equal to or lower than a predetermined speed and where the accelerator opening is equal to or larger than a predetermined opening. In the aforementioned range, the supercharging pressure increase Pa increases as the engine speed decreases and as the accelerator opening increases.

If the engine 1 is operated outside the aforementioned range, the aforementioned supercharging pressure increase Pa is set not as 0 but as a negative value, whereby the supercharger 20 is substantially prohibited from providing assistance (the reason for setting the supercharging pressure Pa as a negative value will be described later). Then, a pressure obtained by adding the supercharging pressure increase Pa to be produced by the supercharger 20 to the base target supercharging pressure Pb is calculated as a target supercharging pressure Pt. The target supercharging pressure Pt is a target value that is set for the sake of supercharging control performed by the supercharger 20, and may not coincide with a truly desired supercharging pressure.

For example, as is apparent from the map shown in FIG. 3, since the supercharging pressure increase Pa is set as a large value if the accelerator opening is large while the engine rotates at a low speed, the target supercharging pressure Pt is set as a large value. The target supercharging pressure Pt set herein is a supercharging pressure that cannot actually be reached by the capacity of the supercharger 20.

By thus setting the target supercharging pressure Pt, the phenomenon of hunting wherein the actual supercharging pressure rises above and drops below the target supercharging pressure is prevented. As a result, the supercharger 20 can provide supercharging assistance reliably and continuously. Consequently, the engine rotational speed is rapidly increased and the target supercharging pressure Pt is lowered according to the map shown in FIG. 3. Even in the case where the target supercharging pressure Pt is set within the capacity of the supercharger 20, the target supercharging pressure Pt is set as a pressure that is slightly higher than a presumably truly desired supercharging pressure by the supercharging pressure increase Pa. Thereby, the phenomenon of hunting can be prevented, and the supercharger 20 is allowed to perform supercharging more reliably.

After the target supercharging pressure Pt has been calculated, the pressure sensor 19 detects a pressure in an intake pipe as an actual supercharging pressure Pr, and a difference $\Delta P$ between the target supercharging pressure Pt and the detected actual supercharging pressure Pr is calculated. Even in the case where the aforementioned supercharging pressure increase Pa assumes a positive value, if the difference $\Delta P$ (=Pt−Pr) is equal to or smaller than 0, the supercharger 20 does not perform supercharging. Therefore, the power applied to the motor 20a is 0. On the other hand, if the difference $\Delta P$ is larger than 0, the supercharger 20 provides assistance in supercharging. Thus, a power to be applied to the motor 20a is determined on the basis of the difference $\Delta P$.

As described above, the supercharging pressure increase Pa may be set as a negative value. A target supercharging pressure Pt to be calculated is thereby calculated as a lower value. Therefore, the difference $\Delta P$ is also calculated as a smaller value. As a result, in the case where the commencement of assistance by the supercharger 20 is not wanted, for example, in the case where the actual supercharging pressure Pr has just fluctuated due to disturbance or the like, it becomes difficult for the supercharger 20 to perform supercharging, and supercharging pressure control can be stabilized. Hence, the supercharging pressure increase Pa in a situation where the supercharger 20 is not considered to be required to perform supercharging is set as a negative value, whereby it becomes difficult for the supercharger 20 to perform supercharging. Thus, supercharging pressure control is stabilized.

As described above, after a power to be applied to the motor 20a has been determined in step 200, it is first determined whether or not an actual supercharging pressure Pr detected by the pressure sensor 19 is equal to or higher than a calculated target supercharging pressure Pt (step 210), for the purpose of driving the valve 25 to adjust a flow amount of intake air flowing through the bypass passage 24. If the result in step 210 is positive, the actual supercharging pressure Pr has already reached the target supercharging pressure Pt. Therefore, the valve 25 is opened (step 220) so as to open the bypass passage 24, and then, the application power (including 0) determined in step 200 is applied to the motor 20a (step 230). The power is applied to the motor 20a by outputting a command value determined by the ECU 16 to the controller 21. The motor 20a is thereby driven.

In this case, however, since the result in step 210 is positive, the actual supercharging pressure Pr is equal to or higher than the target supercharging pressure Pt. Therefore, the application voltage determined in step 200 is 0, and the motor 20a is actually not driven (or is stopped if formerly driven). Further in this case, it is also appropriate that a predetermined period be positively interposed between step 220 and step 230. Hence, in the case where the motor 20a is to be stopped, the bypass passage 24 is first opened (either entirely or partially), and the motor 20a is then stopped.

On the other hand, if the result in step 210 is negative, namely, if the actual supercharging pressure Pr has not reached the target supercharging pressure Pt, it is first determined whether the target supercharging pressure Pt has been set within a capacity range of the motor 20a or whether the target supercharging pressure Pt has been set beyond a limit capacity of the motor 20a to continue to drive the motor 20a reliably (step 240). If the result in step 240 is positive, namely, if the target supercharging pressure Pt has been set within the capacity range of the motor 20a, the application power determined in step 200 is applied to the motor 20a while maintaining a state where the valve 25 keeps the bypass passage 24 shut off (step 230).

On the other hand, if the result in step 240 is negative, namely, if the target supercharging pressure Pt has been set beyond the limit capacity of the motor 20a to allow the supercharger 20 to keep performing supercharging by reliably driving the motor 20a, the actual supercharging pressure Pr does not reach the target supercharging pressure Pt no matter how much time has elapsed. In such a case, the motor 20a is driven with the duty ratio of the valve 25 being set on the basis of the aforementioned difference ΔP so as to gradually open the bypass passage 24. The application power determined in step 200 is applied to the motor 20a not directly but in a gradually decreasing manner (step 250). Finally, the bypass passage 24 is fully opened by the valve 25, and the motor 20a is stopped. In this case as well, after the bypass passage 24 has been opened by the valve 25, the motor 20a is stopped. Thus, if the target supercharging pressure Pt has been set beyond the limit capacity of the motor 20a, the motor 20a is stopped in order to prevent the motor 20a from breaking down.

The aforementioned operation of gradually opening the bypass passage and the aforementioned operation of gradually reducing the power to be applied may be performed on the basis of the difference ΔP as described above. Alternatively, they may be performed at a predetermined rate as soon as the actual supercharging pressure Pr has reached a predetermined supercharging pressure (e.g., 80% of the target supercharging pressure Pt). If the target supercharging pressure Pt has thus been set beyond the capacity of the motor 20a, there is a situation where the effect of supercharging is greatly to be desired. Therefore, a large amount of air is sucked in through supercharging. If the bypass passage 24 is fully opened immediately under such a situation, the intake air supercharged by the supercharger 20 flows backwards via the bypass passage 24. Hence, if the target supercharging pressure Pt has been set beyond the capacity of the motor 20a, the bypass passage 24 is gradually opened by controlling the valve 25 (meanwhile, the power applied to the motor 20a is also gradually reduced in the present embodiment), so that the backflow of intake air is prevented.

According to the present embodiment described above, the supercharger can perform supercharging smoothly. In the case where the motor 20a is stopped to stop the supercharger 20 from performing supercharging, if the bypass passage 24 is opened after the driving of the motor 20a has been stopped all of a sudden, the amount of intake air coming from the supercharger 20 decreases abruptly (or becomes zero) before the flow of intake air is sufficiently created in the bypass passage 24. As a result, the flow of intake air pauses. In the present embodiment, therefore, if the supercharger 20 is to be stopped from performing supercharging as described above, the flow of intake air is first created in the bypass passage 24 by opening it, and the motor 20a of the supercharger 20 is then stopped. In this manner, the engine 1 is prevented from being destabilized due to a pause in the flow of intake air.

It is to be noted herein that the invention is not limited to the aforementioned embodiment. For instance, in the aforementioned embodiment, the flow amount of intake air is adjusted by controlling an open-close duty ratio of the valve 25 as the flow amount adjustment means. However, the flow amount adjustment means may be designed to adjust flow amount by being changed in opening, as is the case with the throttle valve 13 or the like. Further, in the aforementioned embodiment, the bypass passage 24 is gradually opened by gradually opening the valve 25 (i.e., by continuously changing the duty ratio of the valve 25). However, the bypass passage 24 may be opened stepwise by opening the valve 25 stepwise (i.e., by changing the duty ratio of the valve 25 stepwise).

The control apparatus for the internal combustion engine in accordance with the present embodiment has the flow amount adjustment means for electrically and arbitrarily adjusting an amount of intake air flowing through the bypass passage. In stopping the supercharger from performing supercharging, therefore, the flow amount adjustment means is driven, the suction of air via the bypass passage is started, and then the supercharger is stopped from performing supercharging. Thus, after the flow of intake air via the bypass passage has been created, the supercharger is closed. Therefore, even if the amount of intake air flowing via a flow passage on the side of the supercharger has decreased abruptly (or has become zero), the flow of intake air does not pause. As a result, the supercharger can perform supercharging smoothly without destabilizing operation of the internal combustion engine.

If the target supercharging pressure has been set as a value exceeding the capacity of the supercharger, the flow amount adjustment means is driven before the supercharger is stopped from performing supercharging. The suction of air via the bypass passage is thereby started gradually or stepwise, and then the supercharger is stopped from performing supercharging. In this manner, the supercharger can perform supercharging smoothly while the intake air supercharged by the supercharger is prevented from flowing backwards via the bypass passage (and while no pause in the flow of intake air is caused).

What is claimed is:

1. A control apparatus for an internal combustion engine, composing:
    a supercharger connected to an intake passage of the internal combustion engine and driven by a motor;
    a bypass passage which is provided for the intake passage in such a manner as to bypass the supercharger;
    a flow amount adjustment device which variably adjusts a flow amount of air flowing through the bypass passage by being driven electrically; and
    a controller which, when it is determined during a supercharging operation in which the motor is on, to stop the supercharger from performing supercharging, first (i) drives the flow amount adjustment device to increase the flow amount of air flowing through the bypass passage while the motor remains on, and subsequently (ii) stops the supercharger motor.

2. The control apparatus according to claim 1, wherein the controller sets a target supercharging pressure and controls the motor on the basis of the target supercharging pressure, and if the target supercharging pressure has been set as a value exceeding a capacity of the supercharger, the controller drives the flow amount adjustment device and gradually starts suction of air via the bypass passage before stopping the supercharger from performing supercharging.

3. The control apparatus according to claim 1, wherein the flow amount adjustment device, with which the bypass passage is provided, is located upstream of a combined portion of the intake passage and the bypass passage.

4. The control apparatus according to claim 1, wherein
the controller sets a target supercharging pressure and controls the motor on the basis of the target supercharging pressure, and
if the target supercharging pressure has been set as a value exceeding a capacity of the supercharger, the controller drives the flow amount adjustment device and starts suction of air via the bypass passage stepwise before stopping the supercharger from performing supercharging.

5. The control apparatus according to claim 4, further comprising:
a pressure detector that detects a supercharging pressure, and wherein the flow amount adjustment device includes a valve for opening and closing the bypass passage, and the controller changes an opening speed of the valve on the basis of a difference between the target supercharging pressure and the detected supercharging pressure.

6. A control apparatus for an internal combustion engine, comprising:
a supercharger connected to an intake passage of the internal combustion engine and driven by a motor;
a bypass passage which is provided for the intake passage in such a manner as to bypass the supercharger;
a flow amount adjustment device which variably adjusts a flow amount of air flowing through the bypass passage by being driven electrically;
a controller which stops the supercharger from performing supercharging after driving the flow amount adjustment device and starting suction of air via the bypass passage, the controller sets a target supercharging pressure and controls the motor on the basis of the target supercharging pressure; and
a pressure detector that detects a supercharging pressure, and wherein the flow amount adjustment device includes a valve for opening and closing the bypass passage, and the controller changes an opening speed of the valve on the basis of a difference between the target supercharging pressure and the detected supercharging pressure.

7. The control apparatus according to claim 6, wherein
if the target supercharging pressure has been set as a value exceeding a capacity of the supercharger, the controller drives the flow amount adjustment device and gradually starts suction of air via the bypass passage before stopping the supercharger from performing supercharging.

8. The control apparatus according to claim 6, wherein
if the target supercharging pressure has been set as a value exceeding a capacity of the supercharger, the controller drives the flow amount adjustment device and starts suction of air via the bypass passage stepwise before stopping the supercharger from performing supercharging.

9. A control apparatus for an internal combustion engine, comprising:
a supercharger connected to an intake passage of the internal combustion engine and driven by a motor;
a bypass passage which is provided for the intake passage in such a manner as to bypass the supercharger;
a flow amount adjustment device which variably adjusts a flow amount of air flowing through the bypass passage by being driven electrically;
a controller which stops the supercharger from performing supercharging after driving the flow amount adjustment device and starting suction of air via the bypass passage; and
an operational state detector that detects a rotational speed of the internal combustion engine and a load applied to the internal combustion engine and an opening amount of an accelerator, and wherein the controller calculates a target supercharging pressure on the basis of the detected rotational speed and the detected load, and calculates a correction value for the target supercharging pressure on the basis of the detected rotational speed and the detected opening amount of the accelerator.

10. The control apparatus according to claim 9, wherein the controller calculates the correction value as a value that increases as the detected rotational speed decreases, and calculates the correction value as a value that increases as the detected opening amount of the accelerator increases.

11. The control apparatus according to claim 10, wherein the controller calculates the correction value as a positive value if a value determined by the detected rotational speed and the detected opening amount of the accelerator exceeds a predetermined range determined by the rotational speed of the internal combustion engine and the opening amount of the accelerator, and calculates the correction value as a negative value if the value does not exceed the predetermined range.

12. A control method for an internal combustion engine having a supercharger connected to an intake passage of the internal combustion engine and driven by a motor, a bypass passage which is provided for the intake passage in such a manner as to bypass the supercharger, and a flow amount adjustment device which adjusts a flow amount of air flowing through the bypass passage, comprising:
a first step of determining, during a supercharging operation in which the motor is on, whether the supercharger is to be stopped; and
a second step of (i) driving electrically the flow amount adjustment device to increase the flow amount of air flowing through the bypass passage while the motor remains on, and subsequently (ii) stopping the supercharger motor so as to stop the supercharger from performing supercharging, if it is determined in the first step that the supercharger is to be stopped.

13. A control method for an internal combustion engine having a supercharger connected to an intake passage of the internal combustion engine and driven by a motor, a bypass passage which is provided for the intake passage in such a manner as to bypass the supercharger, and a flow amount adiustment device which adjusts a flow amount of air flowing through the bypass passage, comprising:
a first step of determining whether the supercharger is to be stopped;
a second step of driving electrically the flow amount adjustment device, starting suction of air via the bypass passage, and then stopping the supercharger from performing supercharging if it is determined in the first step that the supercharger is to be stopped; and a step of calculating a target supercharging pressure, and wherein it is determined in the first step that the supercharger is to be stopped if the target supercharging pressure has exceeded an upper limit supercharging pressure to be produced by the supercharger.

* * * * *